(12) United States Patent
Xing

(10) Patent No.: US 11,359,153 B2
(45) Date of Patent: Jun. 14, 2022

(54) METHOD FOR PREPARING BIOCHAR

(71) Applicant: Xianjun Xing, Hefei (CN)

(72) Inventor: Xianjun Xing, Hefei (CN)

( * ) Notice: Subject to any disclaimer, the term of this patent is extended or adjusted under 35 U.S.C. 154(b) by 0 days.

(21) Appl. No.: 17/059,444

(22) PCT Filed: Nov. 26, 2018

(86) PCT No.: PCT/CN2018/117448
§ 371 (c)(1),
(2) Date: Nov. 29, 2020

(87) PCT Pub. No.: WO2020/000887
PCT Pub. Date: Jan. 2, 2020

(65) Prior Publication Data
US 2021/0155867 A1    May 27, 2021

(30) Foreign Application Priority Data
Jun. 30, 2018 (CN) .......................... 201810703486.3

(51) Int. Cl.
| | | |
|---|---|---|
| C10L 5/44 | (2006.01) | |
| B01J 29/40 | (2006.01) | |
| C10L 9/08 | (2006.01) | |
| C10B 53/02 | (2006.01) | |

(52) U.S. Cl.
CPC .............. *C10L 5/447* (2013.01); *B01J 29/40* (2013.01); *C10B 53/02* (2013.01); *C10L 9/083* (2013.01)

(58) Field of Classification Search
CPC ........... C10L 5/447; C10L 9/083; B01J 29/40; C10B 57/14; Y02E 50/30
USPC ................ 201/2.5; 202/96, 105; 44/589–599
See application file for complete search history.

(56) References Cited

U.S. PATENT DOCUMENTS

| | | | | | |
|---|---|---|---|---|---|
| 3,749,033 | A | * | 7/1973 | Sugano ..................... | F23G 5/20 110/234 |
| 4,553,978 | A | * | 11/1985 | Yvan ........................ | C10G 1/00 44/280 |
| 4,787,917 | A | * | 11/1988 | Leclerc de Bussy ... | C10L 9/083 44/606 |
| 5,435,983 | A | * | 7/1995 | Antal, Jr. ................. | C10B 53/02 423/445 R |
| 2003/0221363 | A1 | * | 12/2003 | Reed ........................ | C10L 5/363 44/594 |
| 2009/0007484 | A1 | * | 1/2009 | Smith ...................... | C10B 53/02 44/606 |
| 2009/0193679 | A1 | * | 8/2009 | Guyomarc'h ........... | C10L 9/083 34/467 |
| 2009/0250331 | A1 | * | 10/2009 | Hopkins .................. | F26B 17/20 201/6 |
| 2010/0162780 | A1 | * | 7/2010 | Scharf ...................... | C05G 5/40 71/36 |
| 2010/0251616 | A1 | * | 10/2010 | Paoluccio ............... | C10B 53/02 48/197 R |
| 2010/0300866 | A1 | * | 12/2010 | van Aardt ............. | F26B 23/022 201/16 |
| 2011/0057060 | A1 | * | 3/2011 | Sprouse .................. | B02C 23/08 241/19 |
| 2011/0114144 | A1 | * | 5/2011 | Green ..................... | C10B 53/02 136/201 |
| 2011/0154684 | A1 | * | 6/2011 | Lundgen ................. | C10L 9/083 34/427 |
| 2011/0179701 | A1 | * | 7/2011 | Grassi ..................... | C10L 5/442 44/606 |
| 2012/0103781 | A1 | * | 5/2012 | Smaidris ................. | C10B 53/02 201/8 |
| 2012/0116135 | A1 | * | 5/2012 | Gong ...................... | C10B 49/22 585/240 |
| 2014/0001026 | A1 | * | 1/2014 | Baird ...................... | C10B 49/22 201/2 |
| 2014/0030250 | A1 | * | 1/2014 | Eddy ..................... | B01J 20/3042 424/125 |
| 2015/0210931 | A1 | * | 7/2015 | Malyala .................. | C10G 3/48 585/240 |
| 2015/0299086 | A1 | * | 10/2015 | Farha ...................... | C07C 7/08 562/417 |

(Continued)

FOREIGN PATENT DOCUMENTS

| | | |
|---|---|---|
| CN | 104910934 A | 9/2015 |
| CN | 105368470 A | 3/2016 |

OTHER PUBLICATIONS

International Search Report and Writen Opinion of PCT/CN2018/117448 dated Apr. 3, 2019.

*Primary Examiner* — Nina Bhat
(74) *Attorney, Agent, or Firm* — Zhihua Han, Wen IP LLC

(57) ABSTRACT

A method for preparing biochar, including steps as follows: dosing: putting pre-crushed biomass into a reactor; charring conversion: heating the reactor to a certain temperature and pressure, and putting an active group-containing active agent containing 1% to 5% by mass of biomass and a catalyst containing 1% to 10% by mass of biomass (or putting the catalyst first and then putting the active agent) into the reactor to perform solid solution charring on the biomass; and cooling: after the charring conversion is completed, cooling the reactor to 40° C. or lower to obtain the biochar. Feedstocks are abundant and cheap, farmland biomass waste is reused, and the active group-containing active agent is added in biomass charring, which can effectively inhibit side reactions and coordinate with the catalyst to perform solid solution charring on the biomass, thereby improving a biochar conversion rate and making the charring process clean and environmentally friendly.

9 Claims, No Drawings

(56) References Cited

U.S. PATENT DOCUMENTS

| | | | | |
|---|---|---|---|---|
| 2015/0307786 A1* | 10/2015 | Dayton | ............... | B01J 35/1038 |
| | | | | 201/2.5 |
| 2016/0053182 A1* | 2/2016 | Ericsson | ................ | C10L 9/083 |
| | | | | 201/20 |
| 2018/0179447 A1* | 6/2018 | Vasbinder | ................ | C10B 3/00 |
| 2019/0112531 A1* | 4/2019 | Zitomer | ................ | C10G 1/086 |

* cited by examiner

METHOD FOR PREPARING BIOCHAR

CROSS-REFERENCE TO RELATED APPLICATIONS

This application is a 371 of International Patent Application No. PCT/CN2018/117448 with a filing date of Nov. 26, 2018, designating the United States, now pending, and further claims priority to Chinese Patent Application No. 201810703486.3 with a filing date of Jun. 30, 2018. The content of the aforementioned applications, including any intervening amendments thereto, are incorporated herein by reference.

Technical Field

The present invention relates to the technical field of biomass fuel, particularly to a method for preparing biochar.

Background Art

As a demand for fossil fuel in development of national economy increases, consumption of fossil fuel resources is accelerating at a surprising rate, and price thereof continue to climb. Besides, the application of coal produces severe environmental pollution. Facing increasing imbalance between supply and demand of the fossil fuel resources, environmental pollution, and national pressure on energy conservation and emission reduction, development of new energy sources and renewable energy sources has become a necessary trend. As a renewable resource, biomass hardly generates pollution during use and plays an important role of protecting and improving the ecological environment, which makes it one of ideal renewable energy sources with infinite potential to be vigorously developed and utilized.

During biomass charring, biomass bond breaking produces some tar and combustible gas ($CO$, $CH_4$, and the like). By using the conventional technique of torrefaction, the conversion rate of biomass into biochar is 30% to 40%, and the low conversion rate not only wastes energy sources, but also causes large environmental pollution.

SUMMARY OF INVENTION

The present invention provides a method of converting biomass into biochar.

In order to solve the above technical problems, the present invention adopts technical solutions as follows:

A method for preparing biochar, including steps as follows:

dosing: putting pre-crushed biomass into a reactor;

charring conversion: heating the reactor to a certain temperature and pressure, and putting an active group-containing active agent containing 1% to 5% by mass of biomass and a catalyst containing 1% to 10% by mass of biomass into the reactor to perform solid solution charring on the biomass;

cooling: after the charring conversion is completed, cooling the reactor to 40° C. or lower to obtain the biochar.

A method for preparing biochar, including steps as follows:

dosing: mixing pre-crushed biomass with & catalyst and then putting the mixture into a reactor, in which a mass ratio of the biomass to the catalyst is 90 to 99:10 to 1;

charring conversion: heating the reactor to a certain temperature and pressure, and putting an active group-containing active agent containing 1% to 5% by mass of biomass into the reactor to perform solid solution charring on the biomass; and cooling: after the charring conversion is completed, cooling the reactor to 40° C. or lower to obtain the biochar.

Preferably, the active group include one or more of carboxyl, hydroxyl, carbonyl, and methoxy.

Preferably, a content of the carboxyl is 10% to 25% of the active agent, a content of the hydroxyl is 4% to 10% of the active agent, a content of the carbonyl is 13% to 25% of the active agent, and a content of the methoxy is 5% to 15% of the active agent.

Preferably, the hydroxyl is contained in a carboxylic acid, propylene glycol methyl ether acetate, an acrylic acid modified resin, an acid radical, or a polycarboxylic acid.

Preferably, the catalyst is a potassium salt, a calcium salt, a transition metal salt, a metal oxide, or a molecular sieve catalyst.

Preferably, the metal oxide is $Al_2O_3$, $MgO$, or $SiO_2$, and the molecular sieve catalyst is a Y, β, or ZSM-5 molecular sieve.

Preferably, the charring conversion step has a process temperature of 200° C. to 800° C. and charring time of 10 min to 120 min.

When the active agent is put in, a temperature range of the reactor is 220° C. to 580° C., and a pressure range of the reactor is 0.01 MPa to 10.0 MPa.

Further, a drying step and a pre-charring step are included before the charring conversion step, in which a process temperature of the drying step is 120° C. to 150° C., and a process temperature of the pre-charring step is 150° C. to 220° C.

It can be seen from the above technical solutions that the present invention has advantages that feedstocks to be used are abundant and cheap, farmland biomass waste is reused, and the active group-containing active agent is added in biomass charring, which can effectively inhibit side reactions and coordinate with the catalyst to perform solid solution charring on the biomass, thereby improving a coal conversion rate and making the charring process clean and environmentally friendly.

Description of Embodiments

Preferred embodiments of the present invention will be described in detail below.

Biomass feedstocks of the present invention include herbaceous and woody biomass feedstocks such as corn stalks, rice hulls, and wood bits.

The biomass feedstocks are put into a charring device and go through three stages of drying, pre-charring, and charring conversion to finally generate biochar. The drying step is a preparation stage of biomass charring. When the temperature reaches 120° C. to 150° C., moisture contained in the biomass is precipitated out first when heated, and the biomass turns into "dry biomass". The pre-charring step is a starting stage of biomass charring. When the temperature reaches 150° C. to 220° C., the "dry biomass" is heated, unstable components (for example, hemicellulose) therein are decomposed, and a small number of volatile components are precipitated out. The charring conversion step is a main stage of biomass charring. When the temperature reaches 200° C. to 800° C., hemicellulose and cellulose are subjected to violent thermal decomposition, generating a large number of volatile components and releasing a large amount of reaction heat, and the remaining solid product is "preliminary biochar"; at the end stage of biomass charring, a large amount of heat released in the charring conversion stage is used to remove volatile substances remaining in charcoal, thereby increasing a fixed carbon content in the biomass feedstocks to obtain the final biochar.

In the present invention, an active group-containing active agent is added in the charring conversion step, which can effectively reduce side reactions, reduce precipitation of the volatile components, and coordinate with the catalyst to perform solid solution charring on the biomass, thereby improving a biochar conversion rate.

The charring conversion step includes two reaction processes of charring pyrolysis (cracking) and charring solid solution, in which a reaction process temperature of the charring pyrolysis (cracking) is 200° C. to 800° C. and a reaction process temperature of the charring solid solution is 200° C. to 500° C., and the two reaction processes are simultaneously performed, particularly including:

the biomass (powder or granules) is put into a reactor, preheated and pressurized to a certain temperature and pressure; the catalyst acts to instantly break biomass macromolecular bonds into small molecular bonds, and the small molecular bonds continue to break to produce some tar and combustible gas (CO, $CH_4$, and the like) components during bond breaking of the biomass; and the active agent is put in to solid dissolve the overflowing volatile components simultaneously on charcoal, which can inhibit the side reactions and greatly improve the conversion rate of the biochar.

Different catalysts can be used at different temperatures and different pressures to obtain different biochar products. The catalyst is a potassium salt, a calcium salt, a transition metal salt, a metal oxide, water vapor, or a molecular sieve catalyst, in which the metal oxide is $Al_2O_3$, MgO, or $SiO_2$, and the molecular sieve catalyst is a Y, β, or ZSM-5 molecular sieve.

The active group includes any one of carboxyl, hydroxyl, carbonyl, and methoxy, and a content of the carboxyl is 10% to 25% of the active agent, a content of the hydroxyl is 4% to 10% of the active agent, a content of the carbonyl is 13% to 25% of the active agent, and a content of the methoxy is 5% to 15% of the active agent. The hydroxyl is contained in a carboxylic acid, propylene glycol methyl ether acetate, an acrylic acid modified resin, an acid radical, or a polycarboxylic acid. The carboxyl is contained in acetic acid, citric acid, formic acid, and benzoic acid, the carbonyl is contained in formaldehyde, acetone, ethyl acetate, and acetamide, and the methoxy is contained in anisidine, p-anisaldehyde, o-methoxycinnamic acid, and methoxyethane.

Depending on the order of adding the active agent and the catalyst and different varieties thereof, a method for preparing biochar of the present invention is described using Examples as follows.

When the active agent is put in, a temperature range of the reactor is 220° C. to 580° C., and a pressure range of the reactor is 0.01 MPa to 10.0 MPa.

EXAMPLE 1

Dosing: putting pre-crushed corn stalks or granules into a reactor;

charring conversion: heating the reactor to 220° C., and putting a carboxylic acid containing 1% by mass of biomass and a calcium salt containing 1% by mass of biomass into the reactor to perform solid solution charring on the biomass; and cooling: after the charring conversion is completed, cooling the reactor to 40° C. or lower to obtain the biochar.

EXAMPLE 2

Dosing: putting pre-crushed rice hulls or granules into a reactor;

charring conversion: heating the reactor to 300° C., and putting carboxyl containing 5% by mass of biomass and a transition metal salt containing 10% by mass of biomass into the reactor to perform solid solution charring on the biomass; and cooling: after the charring conversion is completed, cooling the reactor to 40° C. or lower to obtain the biochar.

EXAMPLE 3

Dosing: putting pre-crushed wood bits or granules into a reactor;

charring conversion: heating the reactor to 350° C., and putting carbonyl containing 3% by mass of biomass and a Y molecular sieve containing 5% by mass of biomass into the reactor to perform solid solution charring on the biomass; and cooling: after the charring conversion is completed, cooling the reactor to 40° C. or lower to obtain the biochar.

EXAMPLE 4

Dosing: mixing pre-crushed corn stalks or granules with a 1% calcium salt and then putting the mixture into a reactor;

charring conversion: heating the reactor to 220° C., and putting a carboxylic acid containing 1% by mass of biomass into the reactor to perform solid solution charring on the biomass; and cooling: after the charring conversion is completed, cooling the reactor to 40° C. or lower to obtain the biochar.

EXAMPLE 5

Dosing: mixing pre-crushed rice hulls or granules with a 10% transition metal salt and then putting the mixture into a reactor;

charring conversion: heating the reactor to 300° C., and putting a carboxyl containing 5% by mass of biomass into the reactor to perform solid solution charring on the biomass; and cooling: after the charring conversion is completed, cooling the reactor to 40° C. or lower to obtain the biochar.

EXAMPLE 6

Dosing: mixing pre-crushed wood bits or granules with a 5% Y molecular sieve and then putting the mixture into a reactor;

charring conversion: heating the reactor to 350° C., and putting carbonyl containing 3% by mass of biomass into the reactor to perform solid solution charring on the biomass; and cooling: after the charring conversion is completed, cooling the reactor to 40° C. or lower to obtain the biochar.

EXAMPLE 7

Dosing: putting pre-crushed corn stalks or granules into a reactor;

charring conversion: heating the reactor to 220° C., and putting a carboxylic acid containing 1% by mass of biomass, 2% acetic acid, 2% formaldehyde, and a calcium salt containing 1% by mass of biomass into the reactor to perform solid solution charring on the biomass; and cooling: after the charring conversion is completed, cooling the reactor to 40° C. or lower to obtain the biochar.

Time required to catalyze the reaction by adding the catalyst at different charring temperatures is different, and the lower the temperature at which the catalyst is added, the longer the time required to catalyze the reaction. A process temperature of the charring conversion step according to the present invention is 200° C. to 800° C., and charring time thereof is 10 min to 120 min.

COMPARATIVE EXAMPLE 1

Dosing: putting pre-crushed corn stalks into a reactor;

charring conversion: heating the reactor to 220° C., and putting a calcium salt containing 1% by mass of biomass into the reactor to perform charring on the biomass; and cooling: after the charring conversion is completed, cooling the reactor to 40° C. or lower to obtain the biochar.

COMPARATIVE EXAMPLE 2

Dosing: mixing pre-crushed rice hulls with a 10% transition metal salt and then putting the mixture into a reactor;

charring conversion: heating the reactor to perform charring on the biomass; and cooling: after the charring conversion is completed, cooling the reactor to 40° C. or lower to obtain the biochar.

Experimental data of coal conversion rates of Examples 1 to 7 and Comparative Examples 1 and 2 described above were as follows:

|  | Biomass type | Active group type | Catalyst type | Reaction temperature | Coal conversion rate % |
|---|---|---|---|---|---|
| Comparative Example 1 | corn stalks |  | 1% calcium salt | 220° C. | 40% |
| Comparative Example 2 | rice hulls |  | 10% transition metal salt | 300° C. | 41% |
| Example 1 | corn stalks | 1% carboxylic acid | 1% calcium salt | 220° C. | 60% |
| Example 2 | rice hulls | 5% carboxyl | 10% transition metal salt | 300° C. | 63% |
| Example 3 | wood bits | 3% carbonyl | 5% Y molecular sieve | 350° C. | 62% |
| Example 4 | corn stalks | 1% carboxylic acid | 1% calcium salt | 220° C. | 61% |
| Example 5 | rice hulls | 1% carboxylic acid | 10% transition metal salt | 300° C. | 63% |
| Example 6 | wood bits | 3% carbonyl | 5% Y molecular sieve | 350° C. | 62% |
| Example 7 | corn stalks | 1% carboxylic acid, 2% acetic acid, 2% formaldehyde | 1% calcium salt | 220° C. | 64% |

It can be seen from the experimental data that by coordinating the active group-containing active agent with the catalyst, the present invention can inhibit side reactions effectively and perform solid solution charring on the biomass, thereby improving a coal conversion rate and making the charring process clean and environmentally friendly.

The above-described embodiments merely describe preferred embodiments of the present invention and are not intended to limit the scope of the invention, and various modifications and improvements of the technical solutions of the invention made by those skilled in the art all fall within the scope of the invention defined by the claims without departing from the spirit of the invention.

What is claimed is:

1. A method for preparing biochar comprising steps as follows:

drying pre-crushed biomass at a temperature between 120° C.-150° C. and pre-charring the pre-crushed biomass at a temperature between 150° C.-220° C.;

dosing a reactor with the pre-crushed biomass;

heating the pre-crushed biomass disposed within the reactor to a pre-determined temperature and pressure and adding an active group-containing active agent in an amount between 1%-5% by mass of biomass and a catalyst in an amount between 1%-10% by mass of biomass into the reactor and solid charring the biomass;

cooling the charred biomass to a temperature of less than or equal to 40° C. thereby obtaining the cooled biochar.

2. A method for preparing biochar; comprising steps as follows:

drying pre-crushed biomass at a temperature between 120° C.-150° C. and pre-charring the pre-crushed biomass at a temperature between 150° C.-220° C.;

mixing the pre-crushed biomass with a catalyst and then adding the mixture into a reactor, in which a mass ratio of the biomass to the catalyst is 90 to 99:10 to 1;

heating the reactor to a pre-determined temperature and pressure, and adding an active group-containing active agent in an amount between 1%-5% by mass of biomass into the reactor and solid charring the biomass;

cooling the charred biomass to a temperature of less than or equal to 40° C. thereby obtaining the biochar.

3. The method for preparing biochar according to claim 1 or 2, wherein an active group of the active group-containing active agent is at one selected from the group consisting of carboxyl, hydroxyl, carbonyl, and methoxy.

4. The method for preparing biochar according to claim 3, wherein the carboxyl content of active agent is between 10%-25%, the hydroxyl content of the active agent is between 4%-10%, the carbonyl content of the active agent is between 13%-25%, and the methoxy content of the active agent is between 5%-15%.

5. The method for preparing biochar according to claim 3, wherein the hydroxyl is contained in a carboxylic acid, propylene glycol methyl ether acetate, an acid radical, or a polycarboxylic acid.

6. The method for preparing biochar according to claim 1 or 2, wherein the catalyst is selected from a group consisting of a potassium salt, a calcium salt, a transition metal salt, a metal oxide, and a molecular sieve catalyst.

7. The method for preparing biochar according to claim 6, wherein the metal oxide is selected from a group consisting of $Al_2O_3$, MgO, or $SiO_2$, and the molecular sieve catalyst is a Y, β, and ZSM-5 molecular sieve.

8. The method for preparing biochar according to claim 1 or 2, wherein the biomass charring is took place between 200° C.-800° C. for a charring duration between 10 min-120 min.

9. The method for preparing biochar according to claim 1 or 2, wherein the active agent is added to the reactor at a temperature between 220° C.-580° C. and a pressure between 0.01 MPa-10.0 MPa.

* * * * *